Figure 1:
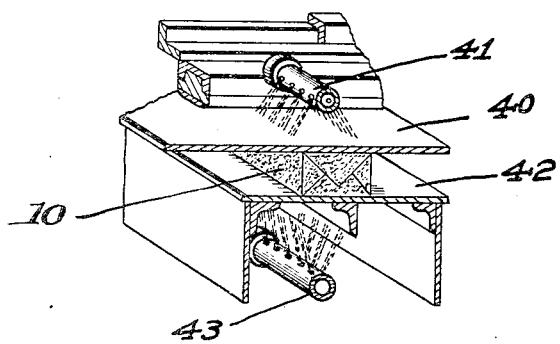

April 17, 1934.    C. BIRDSEYE    1,955,484
FOOD PRODUCT AND METHOD OF PREPARING THE SAME
Filed Feb. 1, 1930

INVENTOR
Clarence Birdseye
by H.W.Kenway. Atty

Patented Apr. 17, 1934

1,955,484

UNITED STATES PATENT OFFICE 1,955,484

FOOD PRODUCT AND METHOD OF PREPARING THE SAME

Clarence Birdseye, Gloucester, Mass., assignor to Frosted Foods Company, Inc., Dover, Del., a corporation of Delaware Application February 1, 1930, Serial No. 425,094

3 Claims. (Cl. 99—14)

This invention relates to improvements in preparing frozen vegetable products for use by the consumer and includes within its scope the novel food product so produced.

Certain vegetable products have heretofore been preserved by freezing; for example, strawberries with added sugar, have been packed and frozen in barrels or casks and sweet corn has been frozen in blocks of ice, but by none of the freezing processes heretofore practiced has it proved commercially practicable to supply the consumer with vegetables preserved by freezing and packaged for distribution as frozen units of convenient size. I have discovered that many vegetable products may be so treated and prepared by first subjecting them to a pre-cooking step, then freeing from surplus water and finally packaging and freezing in cartons. In one aspect, accordingly, my invention consists in an improvement in preparing vegetable products for storage, distribution and use characterized by a pre-cooking step followed by packaging and freezing in this manner.

The extent or degree of the pre-cooking step is of secondary importance only and may be carried to a point determined by the requirements of the particular raw product being dealt with and the manner in which it is to be used. It is desirable generally, however, in the pre-cooking step to effect a modification of the product in a number of different respects. In the first place, the product may be sterilized or partially sterilized and the danger of bacteriological deterioration thus practically eliminated. In the second place, objectionable oxidation of the product may be prevented in a marked degree, such oxidation, for example, as that occurring in an exposed surface of raw apple or banana. Then, by rendering the product pliable and removing its natural resiliency, the packing thereof in marketable packages is greatly facilitated and the dense and compact mass of the pre-cooked product may be frozen with greatest economy and resists thawing with best advantage.

By the improved process of my invention, moreover, a large quantity of moisture is removed from the product before packaging, rather than after distribution as is now the case. This is advantageous from the standpoint of economy since it is thus unnecessary to freeze this superfluous moisture or to transport its additional weight in the product. Incidentally, if the product is pre-cooked in large quantities under commercial conditions, the extracted moisture may be concentrated and profitably used instead of being wasted as it usually is when available only in domestic quantities.

My invention may be applied with particular advantage to the preparation of frozen consumer packages of vegetable product in that the moist, soft and partially sterilized pre-cooked food stuff may be conveniently and compactly shaped and packed in containers, such as cartons, wrapped and substantially hermetically sealed therein and then, while thus protected from contamination, frozen into solid blocks particularly well adapted for handling, storage and distribution under commercial conditions. In another aspect, accordingly, my invention consists in a method of packaging vegetable products which consists in pre-cooking the raw product, enclosing and sealing the pre-cooked product in a container and then freezing the product in its container. The frozen package thus produced is also believed to be novel and constitutes a feature of the invention.

It may be pointed out that the pre-cooking and freezing steps which characterize the method of my invention both contribute to break down the cellular structure of the raw vegetable product, as is necessary in rendering it fit for human consumption. When such vegetables as carrots, turnips and the like are prepared by cooking alone, a considerable per cent of the cooking time is required to break down the cellular structure. In softer vegetables, such as asparagus, spinach and the like, a smaller proportion of the cooking time is required for this purpose, but in all cases this factor must be reckoned with as requiring both time and energy in the form of heat. The effect of freezing or quick-freezing a vegetable product is also largely to break down the cellular structure, since the cells are relatively non-elastic and the expansion of their contents in freezing is sufficient to rupture the cells. It will be apparent that the two steps supplement each other in effectively breaking down the cellular structure of the vegetable with a resulting economy in the time and heat required for cooking. The freezing step is, therefore, utilized to double advantage in that it not only preserves the vegetable product and solidifies the package but performs mechanical work on the product. A product thus prepared reaching the consumer requires only to be warmed or slightly cooked to render it edible.

By subjecting a vegetable product to the supplementary steps of pre-cooking and freezing, it is possible to reduce the cooking time by one-half to two-thirds as compared with that otherwise required, thus effecting an important economy and rendering possible the preparation of the product by the consumer with the assistance of electrical or other apparatus effective to supply a limited amount of heat or heat for a limited period. Moreover, by subjecting different vegetables to different degrees of pre-cooking, they may all be brought to a condition wherein the same amount of further cooking will suffice to prepare them for the table, with all the resulting convenience to the housewife.

Still another advantage of my invention lies in the fact that upon thawing, the frozen product returns to a cooked or semi-cooked condition and not an uncooked condition as heretofore. The result is that the product may be kept in good condition before serving for a much longer time than would be otherwise expedient. Finally, inasmuch as the product reaches the consumer as a cooked product, the purchaser does not insist upon the fresh appearance which would be otherwise required of a fresh product.

Figure 2:
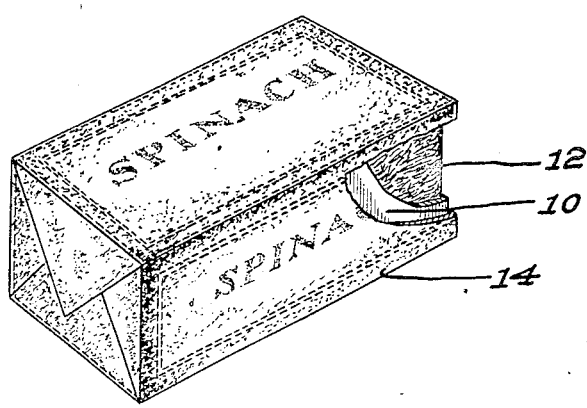

My invention may be practiced advantageously in preparing for the consumer practically any vegetable and by this term I include fruit and berries. For purposes of illustration, I have shown in the accompanying drawing a consumer package of spinach prepared in accordance with my invention and have suggested one manner in which the freezing step may be carried out in freezing spinach or other vegetables. In the drawing, Fig. 1 is a fragmentary view in perspective showing a packed carton in position between heat-conductive members; and Fig. 2 is a view in perspective of a complete package with portions broken away.

My invention may be practiced with particularly good advantage in preparing spinach in consumer packages. Fresh spinach includes a large amount of moisture which is extracted in cooking and never reaches the consumer, so that its removal at an early stage in the process of its preparation is of decided economical advantage. Partly on account of this moisture, the bulk of raw spinach is very great compared to its volume when prepared for consumption.

In practicing the method of my invention, the raw spinach is first cleaned and the large stem sections removed. It is then boiled for a short time or sufficiently to remove its natural resiliency, extract the superfluous moisture and render it soft and pliable. In this step the spinach is also substantially sterilized and its volume reduced to a striking degree.

The pre-cooked or partially cooked spinach is then drained of free water and thus prepared to be conveniently packed in a paste-board carton or other container without excess water. On account of its soft and pliable condition, it will pack compactly and conform itself in the mass exactly to the shape of the carton with a minimum of voids or air spaces.

When the carton is substantially full, it may be closed, wrapped in a moisture and vapor-proof material, such as "cellophane", and sealed substantially hermetically. It will be noted that the pre-cooked spinach has thus been protected from bacteriological deterioration and by promptly sealing it as above outlined it is also protected from exterior contamination.

The sealed carton with its contents may next be frozen, preferably quick-frozen, and thus converted into a solid block ready for shipment or storage. The freezing step may be carried out with good advantage in refrigerating apparatus of any commercial type such, for example, as that shown in my Patent No. 1,773,081, dated August 12, 1930. In Fig. 1 the carton 10 is shown as interposed between parallel heat-conductive bands 40 and 42 which are maintained at a temperature of approximately −40° F. by refrigerated calcium chloride brine supplied by the pipes 41 and 43. The heat of the carton and its contents is thus removed by direct conduction and under the conditions suggested the sealed carton with its soft and yielding contents is converted in about 20 minutes to a solid brick.

The complete consumer package is shown in Fig. 2, wherein the pre-cooked spinach 12 is shown as completely filling the carton 10 which is of cardboard, preferably treated with paraffin to render it waterproof. The carton is wrapped and sealed in a thin transparent covering of moisture and vapor-proof "cellophane" 14 which is effective to prevent evaporation from the frozen package while at the same time displaying the marking of the wrapped carton.

Such a consumer package as that illustrated in Fig. 2 may be transported conveniently and kept in storage for long periods of time without deterioration. When the consumer desires to use its contents, the carton is opened and the frozen block of spinach rendered edible by thawing and boiling for approximately 5 minutes. It will be understood that the breaking down of the cellular structure of the spinach, due to the freezing operation, substantially reduces the cooking time which would otherwise be required to render the spinach edible. It is not necessary to subject the spinach immediately to the final cooking operation after it has been thawed as it does not return to its fresh state but instead re-assumes the pre-cooked condition to which it had been brought before being subjected to the freezing step.

Having thus described my invention, what I claim as new and desire to secure by Letters Patent is:

1. The method of preparing a marketable package of vegetable product, which consists in partially cooking the raw vegetable to remove a portion of its moisture content, render it pliable and compact, and partially break down its cellular structure, then packing the partially cooked product in a carton without excess water, and finally freezing the packed carton in a manner maintaining its shape and converting it into a solid block.

2. The method of preparing a marketable package of spinach, which consists in partially cooking the raw spinach to remove a portion of its moisture content, render it pliable and compact, and partially break down its cellular structure, then completely filling a carton with the partially cooked spinach, closing and sealing the carton, and finally quick-freezing the filled carton from opposite sides thereby converting it into a solid block and at the same time further breaking down the cellular structure of the spinach contained therein.

3. A frozen marketable package comprising a carton substantially hermetically sealed and completely filled with a frozen compact vegetable product, not more than partially cooked, containing less than its natural moisture content and having its cellular structure partially broken down, the carton and its contents forming a solid frozen unit adapted for storage and transportation.

CLARENCE BIRDSEYE.